United States Patent
Goodman et al.

(10) Patent No.: US 12,401,524 B2
(45) Date of Patent: Aug. 26, 2025

(54) VERIFYING AUTHORITY IN DISTRIBUTED SYSTEMS

(71) Applicant: Dell Products L.P., Round Rock, TX (US)

(72) Inventors: Bradley K. Goodman, Nshua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 313 days.

(21) Appl. No.: 18/358,278

(22) Filed: Jul. 25, 2023

(65) Prior Publication Data

US 2025/0038996 A1   Jan. 30, 2025

(51) Int. Cl.
*H04L 9/32* (2006.01)

(52) U.S. Cl.
CPC .......... *H04L 9/3265* (2013.01); *H04L 9/3271* (2013.01)

(58) Field of Classification Search
CPC ............................ H04L 9/3265; H04L 9/3271
See application file for complete search history.

(56) References Cited

U.S. PATENT DOCUMENTS

| | | | |
|---|---|---|---|
| 9,280,645 B1 * | 3/2016 | Alikhani | G06F 21/31 |
| 9,787,477 B1 * | 10/2017 | Singal | H04L 9/3265 |
| 9,866,531 B2 * | 1/2018 | Perkins | H04L 63/029 |
| 2011/0010543 A1 * | 1/2011 | Schmidt | H04W 12/06 |
| | | | 713/168 |
| 2013/0087620 A1 * | 4/2013 | Sharma | G06K 19/06159 |
| | | | 235/494 |
| 2016/0359629 A1 * | 12/2016 | Nadathur | H04L 9/14 |
| 2018/0139054 A1 * | 5/2018 | Chu | H04L 9/008 |
| 2018/0198764 A1 * | 7/2018 | Kumar | H04L 63/126 |
| 2018/0276270 A1 * | 9/2018 | Bisbee | G06Q 30/0241 |
| 2018/0302226 A1 * | 10/2018 | Heimlicher | H04L 63/061 |
| 2019/0312720 A1 * | 10/2019 | Liu | H04L 9/083 |
| 2020/0005570 A1 * | 1/2020 | Troia | B60R 25/24 |
| 2020/0052905 A1 * | 2/2020 | Mathias | H04L 9/3265 |
| 2020/0344072 A1 * | 10/2020 | Yan | H04L 9/3231 |
| 2021/0075783 A1 * | 3/2021 | Mazzara, Jr. | G07C 9/00174 |
| 2021/0409206 A1 * | 12/2021 | Cao | H04L 9/3247 |
| 2022/0417020 A1 * | 12/2022 | Gomi | H04L 9/321 |
| 2023/0388309 A1 * | 11/2023 | Bose | G06F 21/6218 |
| 2024/0406003 A1 * | 12/2024 | Murialdo | H04L 9/0877 |

* cited by examiner

*Primary Examiner* — Gary S Gracia

(74) *Attorney, Agent, or Firm* — WOMBLE BOND DICKINSON (US) LLP

(57) ABSTRACT

Methods and systems for securing endpoint devices are disclosed. To secure the endpoint devices, a flexible system for verifying authority may be used. The flexible system may allow data processing system in resource constrained environment to invoke the functionalities of other data processing systems. The flexible system may reduce the resources expended for invoking functionalities of other data processing systems by not requiring that requests for the invocation of the functionalities include sufficient verification for the other data processing systems to verify that the requestors have sufficient authority to invoke the functionalities of the other data processing systems.

20 Claims, 6 Drawing Sheets

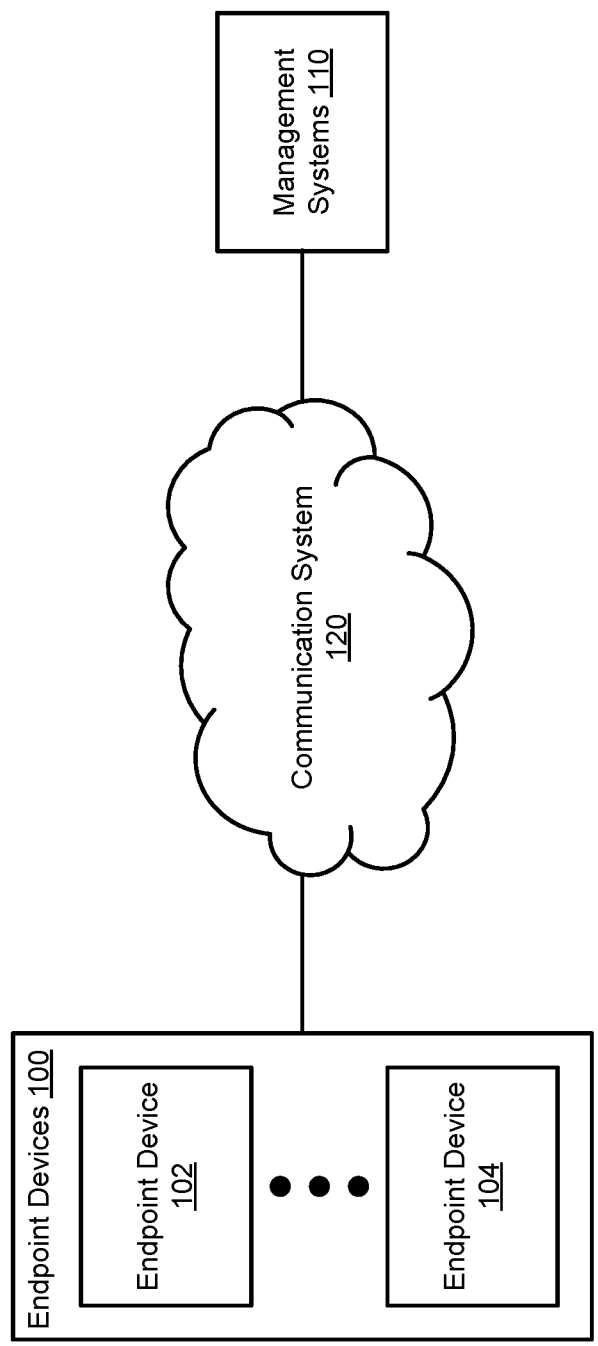

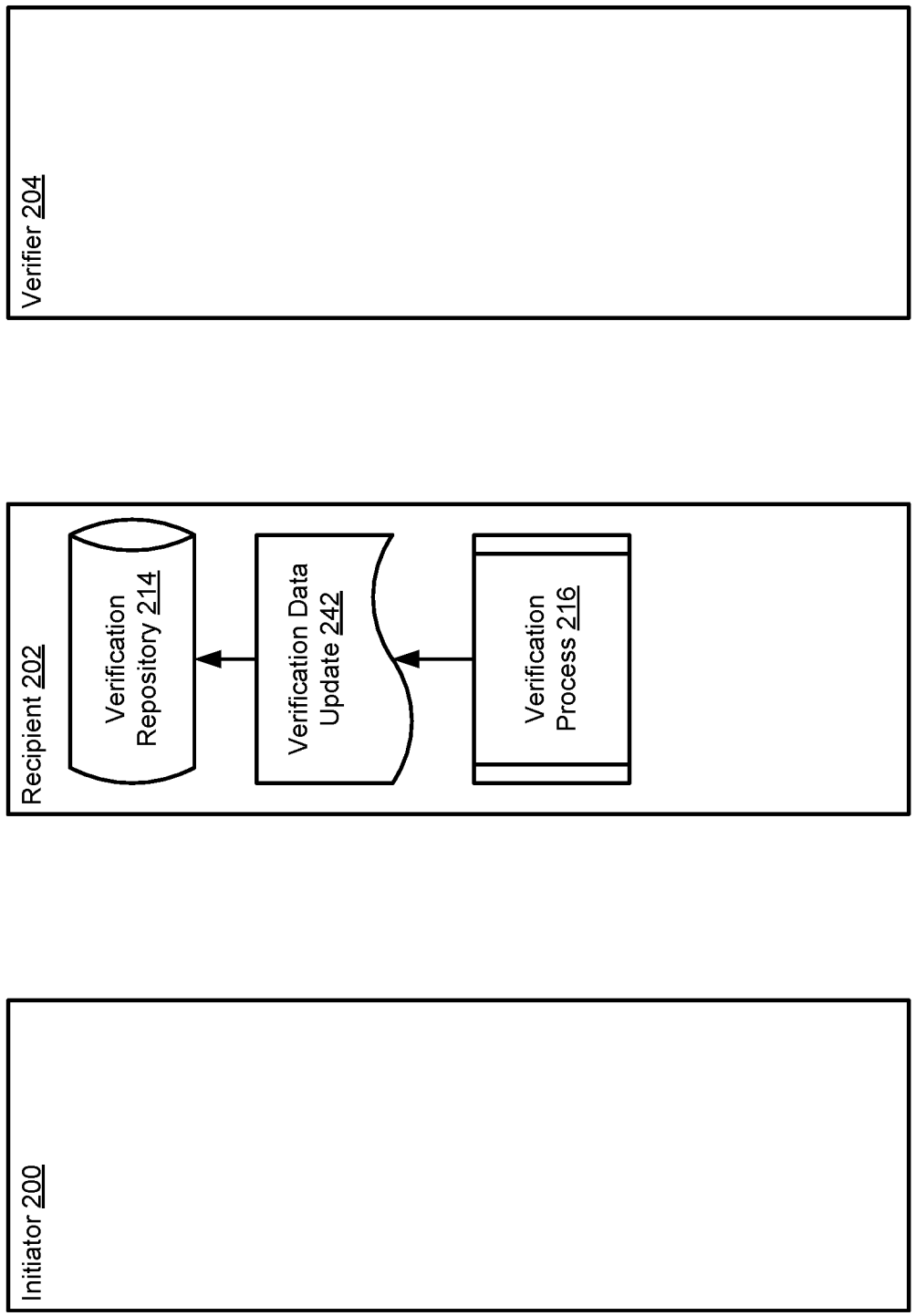

VERIFYING AUTHORITY IN DISTRIBUTED SYSTEMS

FIELD

Embodiments disclosed herein relate generally to security. More particularly, embodiments disclosed herein relate to securing devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIGS. 2A-2C show data flow diagrams in accordance with an embodiment.

DETAILED DESCRIPTION

Figure 2A:
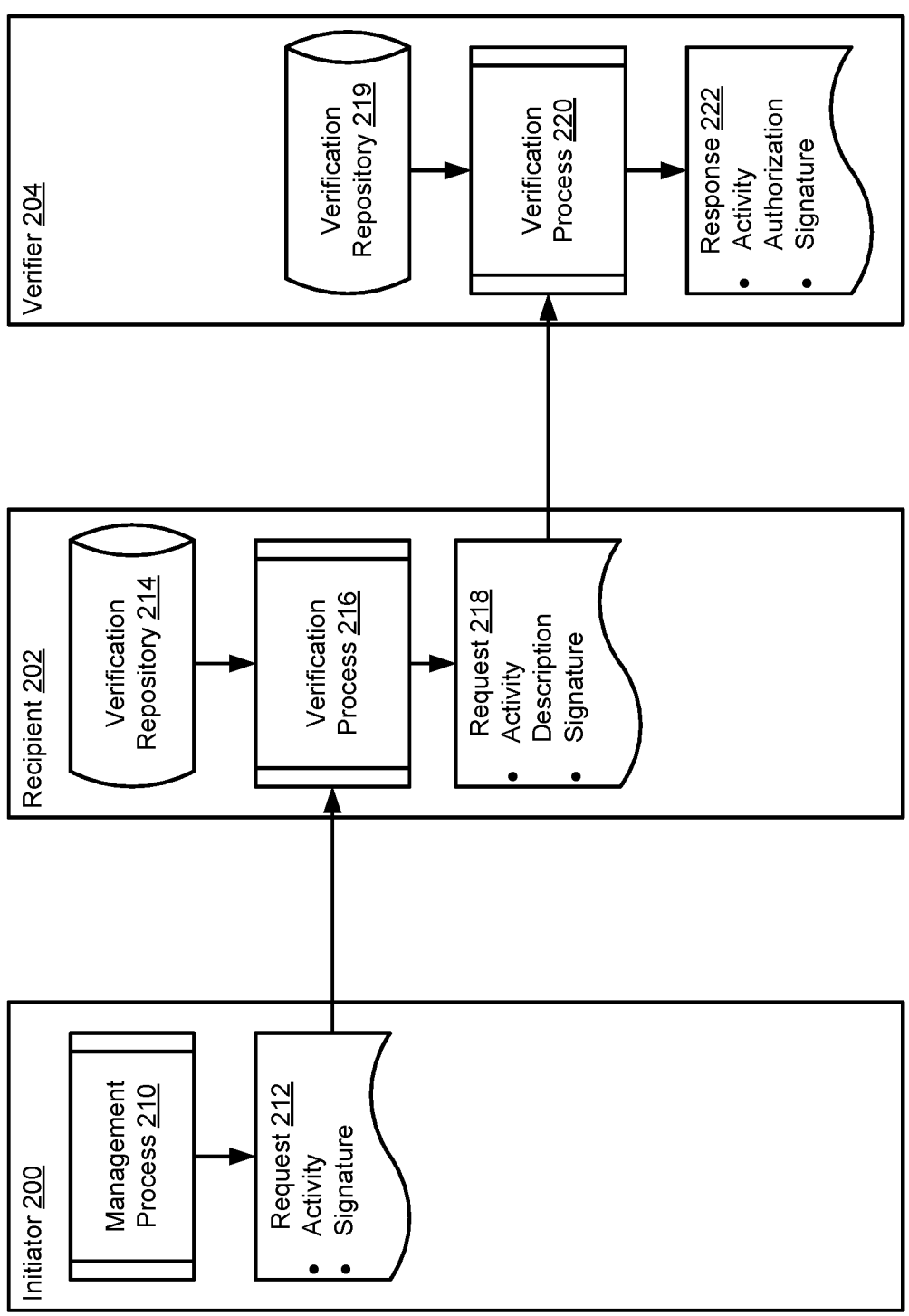

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing operation of endpoint devices using a flexible approach. The flexible approach may allow for functionalities of a data processing systems to be invoked in resource constrained environments.

For example, a first data processing system (e.g., an "initiator") may need to invoke functionality of a second endpoint device (e.g., a "recipient"). The initiator may do so by sending a request to the recipient. To establish that the initiator has been delegated authority to invoke the functionality, the recipient may need to have access to verification information that is sufficient to cryptographically verify that the initiator has been delegated the authority. However, due to network communication limitations between the initiator and the recipient and/or for lack of having access to certain verification information, initiator may not be able to provide sufficient verification information to the recipient to enable recipient to verify authority of the initiator.

Rather than rejecting the request for lack of ability to verify the authority of the initiator, the recipient may take proactive action to determine whether the initiator has the necessary authority. To do so, the recipient may rely on a third data processing system (e.g., a "verifier") to verify the authority of the initiator. The verifier may have access to additional verification information which the recipient did not have access to while trying to verify the authority of the initiator.

By doing so, embodiments disclosed herein may allow data processing systems located in resource constrained environment (e.g., lacking bandwidth and/or access to verification information) to invoke the functionalities of other data processing systems. By doing so, the data processing systems within the resource constrained environment may be more likely to be able to provide desired computer implemented services.

In an embodiment, a method for managing operation of devices in a distributed system is provided. The method may include obtaining, by a recipient and from an initiator, a request for performance of an activity; making a first determination regarding whether the request is verifiable using local verification data maintained by the recipient; in a first instance of the first determination where the request is not verifiable: identifying a remote verifier for the request; requesting that the remote verifier attempt to verify the request; making a second determination regarding whether the remote verifier successfully verified the request; and in a first instance of the second determination where the remote verifier successfully verified the request; performing, by the initiator, the activity.

The method may also include, in a second instance of the first determination where the request is verifiable: performing, by the initiator, the activity.

The method may also include, in a second instance of the second determination where the remote cannot verify the request: rejecting the request for performance of the activity.

Making the first determination may include identifying a signature from the request; and identifying that the local verification data lacks a certificate chain delegating authority for the activity to an entity that establish the certificate and that is usable to authenticate the signature with respect to a root of trust for the recipient.

Requesting that the remote verifier attempt to verify the request may include generating a challenge for the remote verifier, the challenge requiring cryptographic data usable to establish trust in the entity; and sending the challenge to the remote verifier.

Making the second determination may include obtaining a challenge response to the challenge; and in an instance of the obtaining when the challenge response comprises a signature of a trusted entity and an endorsement of authority of the entity to initiate the activity: concluding that the remote verifier verified the request.

Requesting that the remote verifier attempt to verify the request further may include identifying that the remote verifier is unreachable. The challenge may be sent to the remote verifier after the remote verifier becomes reachable.

The request may not include verification data for the request, the verification data being usable to verify that the initiator has authority to initiate the activity by the recipient.

The method may also include obtaining, by the recipient and from a second initiator, a second request for performance of an activity, the second request comprising second verification data for the second request, the second verification data being usable to verify that the second initiator has authority to initiate the activity by the recipient.

The initiator may be operably connected to the recipient via a limited channel (e.g., a limited communication channel, a limited communication link, etc.), the limited channel preventing the verification data from being part of the request.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include endpoint devices 100. Each endpoint device (e.g., 102, 104) may provide similar and/or different computer implemented services, and may provide the computer implemented services independently and/or in cooperation with other endpoint devices.

To provide the services, each of endpoint devices 100 may utilize functionalities of other endpoint devices. For example, a first endpoint device (e.g., 102) may request that a second endpoint device (e.g., 104) perform a certain activity, series of activities, perform certain actions, etc. When so performed, the activity of the second endpoint device may allow the first endpoint device to accomplish a goal, objective, etc.

To invoke the functionalities of other endpoint devices, a first endpoint device may send a request to a second endpoint device. The request may indicate the type of activity to perform. When a second endpoint device obtains the request, the second endpoint device may perform the type of the activity thereby contributing to a goal, objective, etc. of the first endpoint device.

To reduce the potential for malicious activity to impact operation of endpoint device 100, endpoint devices 100 may implement an authentication framework for requests. The authentication framework may require that authority for a first endpoint device to invoke a functionality of a second endpoint device be verified prior to granting requests that invoke the functionality. For example, if a first endpoint device attempts to invoke data storage functionality of a second endpoint device, the second endpoint device may verify that the first endpoint device has authority to invoke data storage functionality. Consequently, the authentication framework may limit the ability of malicious entities to invoke functionalities of endpoint devices.

To verify authority, an endpoint device may attempt to establish chains of delegation of authority from a root of trust for the endpoint device to an entity attempting to invoke a functionality of the endpoint device. The chains of delegation may be established using, for example, (i) certificates that delegate authority, (ii) attestations that verify authority, and/or other types of cryptographically verifiable data structures.

For example, a data processing system may maintain a public key usable to verify signatures (e.g., made using a corresponding private key) from the root of trust. To establish the delegation, the data processing system may identify a chain of certificates that establishes a delegation of authority for invocation of a functionality from the root of trust to an entity (e.g., an "initiator") trying to invoke the functionality. The data processing system may do so by sequentially identifying certificates that include (i) delegations of the authority between entities, and (ii) that establish a cryptographically verifiable chain from the root of trust to the initiator. The cryptographically verifiable chain may include certificates that include public keys of entities to which authority is being delegated and that are signed using private keys of the entities making the delegation. In this manner, the certificates may establish a cryptographically verifiable chain of delegations from the root of trust to the initiator.

In another example, the chain may include an attestation of a trusted entity. That attestation may attest to the authority of the initiator, and may be signed using a private key of the attestor. If the attestor is trusted by the data processing system, then the attestation may serve as verification of the authority of the initiator.

To facilitate verification of authority of the initiator, the request may include certificates, attestations, and/or other types of cryptographically verifiable data structures. By including these cryptographically verifiable data structures, the recipient of the request may have access to all of the information necessary to verify the request.

However, if the request does not include these cryptographically verifiable data structures and the recipient does not have access to them, then the recipient may be unable to verify the request. For example, if two endpoint devices are operably connected to one another via a limited connection (e.g., low bandwidth, low capacity), then requests that include the cryptographically verifiable data may not be transmitted. In another example, if an initiating endpoint device (e.g., an initiator) lacks access to some cryptographically verifiable data structures necessary to verify the delegation of authority, then the requests may not be self-verifying to the recipient endpoint device.

If an endpoint device is unable to transit self-verifying requests to other devices, then the endpoint device may be unable to invoke the functionalities of other endpoint devices. Accordingly, the endpoint device may be unable to meet its objective or other goals for lack of ability to utilize functionalities of the distributed system.

In general, embodiments disclosed herein may provide methods, systems, and/or devices for securing functionalities of endpoint devices in distributed systems. To secure the functionality of the endpoint devices, the endpoint devices may implement a flexible verification model. The flexible verification model may allow requests from other devices to be verified even when the requests are not self-verifiable and/or verifiable using local verification information.

To verify such requests, the endpoint devices may, when the requests are received, rely on other devices to provide information usable to verify that the requests are issued by entities with sufficient delegated authority. The endpoint devices may generate and send challenges to these other devices. The challenges may require that the other devices provide information in a verifiable format that allows for the requests to be verified.

For example, a first endpoint devices may issue a challenge to management system 110. In response, management system 110 may provide a verifiable response with attestations, certificates, and/or other types of cryptographically verifiable data structures. These data structures may include information that establishes that a requestor has been delegated authority to invoke functionalities of the first endpoint device.

By doing so, functionalities of endpoint devices may be invoked even though sufficient information to verify requests for the functionalities is unavailable to a recipient device. Consequently, initiating devices that may be unable to provide self-verifying requests may be able to invoke the functionalities of endpoint devices. Accordingly, the endpoint devices may be used in more challenging environments that may preclude transmission of self-verifying requests.

For example, if a first endpoint device is operably connected to a second endpoint device via a communication link (e.g., bandwidth limited, time limited, etc.) that prevents transmission of a self-verifiable request, the first endpoint devices may send a request without verification information. The recipient device may automatically take actions to obtain information to verify the request rather than merely refusing it for lack of ability to verify the request initially. If the recipient is similarly limited in connectivity, the recipient may wait until connectivity improves to verify the request.

To provide the above noted functionality, the system of FIG. 1 may include endpoint devices 100 and management system 110. Each of these components is discussed below.

Figure 2B:
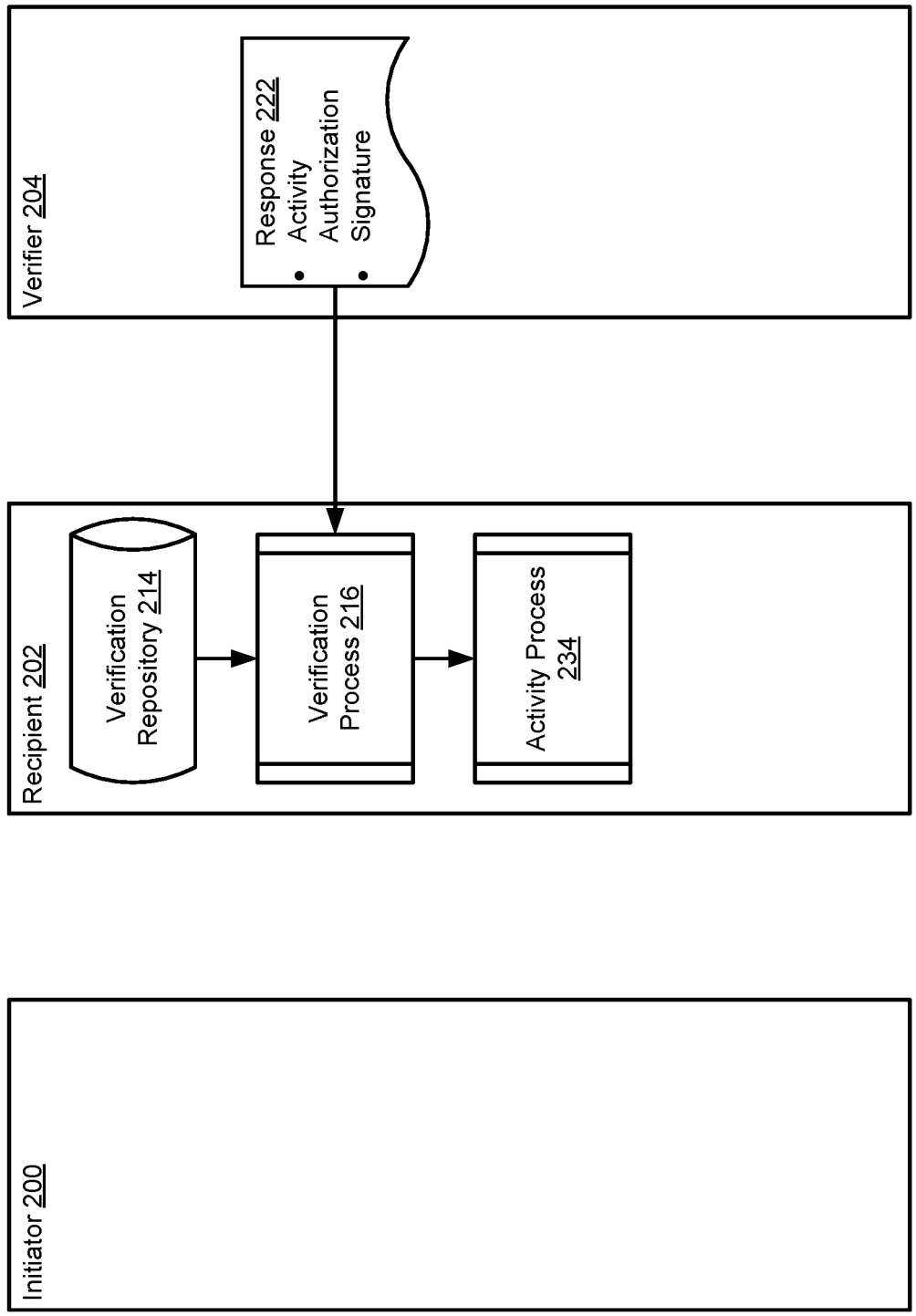

Endpoint devices 100 may provide computer implemented services that may be secured using a flexible verification framework. The flexible verification framework may allow for both self-verifying requests and non-self-verifying requests to be verified (or at least attempted to be verified). Once verified, the activity indicated by the requests may be performed. Similarly, endpoint devices may use a flexible request framework. The flexible request framework may facilitate dynamic generation of self-verifying requests and non-self-verifying requests depending on the conditions to which an endpoint device is exposed. Refer to FIGS. 2A-2C for additional details regarding the operation of endpoint devices 100.

Management system 110 may participate in verification of requests. For example, endpoint devices 100 may treat management system 110 as a remote source of verification information for requests. Management system 110 may participate in the flexible verification framework by (i) obtaining challenges, based on received requests, from endpoint devices 100, (ii) analyze the challenges to formulate responses that include information usable by endpoint devices 100 to verify the requests, and (ii) provide the responses to endpoint devices 100. The management system 110 may include various types of cryptographically verifiable data structures including, for example, certificates defining delegations of authority, and include functionality to generate cryptographically verifiable data structures such as attestations. Refer to FIGS. 2A-2C for additional details regarding the operation of management system 110.

Figure 3:
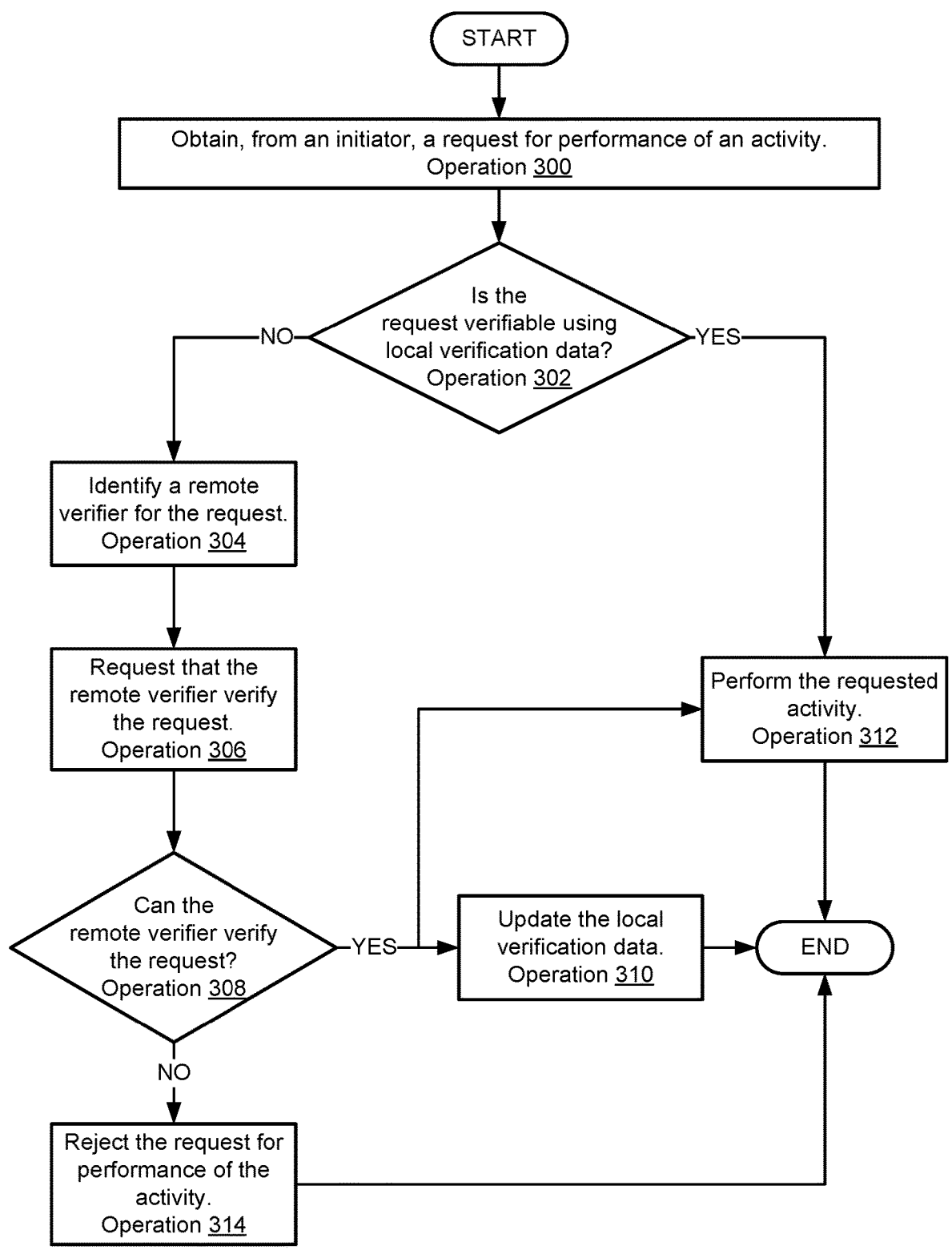
FIG. 3 shows a flow diagram illustrating method in accordance with an embodiment.

When providing their functionality, any of (and/or components thereof) endpoint devices 100 and/or management system 110 may perform all, or a portion, of the method illustrated in FIG. 3.

Any of (and/or components thereof) endpoint devices 100 and management system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, the system of FIG. 1 comprises another communication system that operably connects various endpoint devices 100 to one another. The communication system may be implemented using limited connections.

For example, the limited connections may include bandwidth limited connections (e.g., low bandwidth), payload size limited connections (e.g., radio frequency identification tag based communication systems which may be capable of storing specific sized payloads and transmitting that size of payload), time varying connections which may limit when data may be sent, and/or other types of limited connections. Communication system 120 may include some similar types of connections. Consequently, any of endpoint devices 100 and management systems 110 may be limited in communication capability. Consequently, any of endpoint devices 100 may elect to send requests that may not be self-verifying and/or verifiable using information locally available to a recipient.

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 212, 216, etc.) is used to represent data structure, a second set of shapes (e.g., 210, 216, etc.) is used to represent processes performed using and/or that generate data, and a third set of shapes (e.g., 214) is used to represent large scale data structures such as databases.

Turning to FIG. 2A, a first data flow diagram in accordance with an embodiment is shown. The first data flow diagram may illustrate data used in and data processing performed in invocation of functionality of data processing systems, and verification of requests for the invocation of the functionality.

To invoke a functionality of anther device, initiator 200 (e.g., a first data processing system) may perform management process 210. Management process 210 may manage interactions with other devices. For example, management process 210 may be performed by management entities such as operating systems, drivers, etc. that utilize various hardware resources of initiator 200.

During management process 210, requests from applications (not shown) or other entities hosted by initiator 200 may be obtained. These requests may be for functionalities of other devices. For example, a request may be generated by an application (e.g., a database application). The request may be for another instance of the application to perform a data processing action to bring data managed by the other application into a consistent state with the data of the application.

When management process 210 obtains the request for activity to be performed by another entity, management process 210 may identify a corresponding recipient for the request and sign the request thereby obtaining request 212. Once obtained, request 212 may be sent to recipient 202 (e.g., another endpoint device or other type of data processing system).

When received by recipient 202, request 212 may be processed via verification process 216. During verification process 216, request 212 may be analyzed to ascertain whether sufficient verification information is available to confirm that initiator 200 has authority to invoke performance of the requested activity by recipient 202. Verification information may be included as part of or with request 212, and may be locally available in verification repository 214. For example, certificates, attestations, and/or other types of cryptographically verifiable data structures that delegate authority may be available from these sources and to verification process 216. Verification process 216 may attempt to use these data structures to establish a chain of delegation for the activity to initiator 200.

However, these sources of verification information may not include sufficient verification information to establish that delegation of authority over recipient 202 for the requested activity. Verification process 216 may analyze the available verification information (e.g., included with request, from local sources) to attempt to ascertain whether the delegation can be established. If the delegation cannot be established using the available verification information, then verification process 216 may (i) select a verifier, (ii) generate request 218, and (iii) send request 218 to the verifier (e.g., 204).

Request 218 may include, for example, a description of the activity to be performed, information regarding the initiator (e.g., 200), and/or other information regarding the requested activity/initiator. The information regarding the initiator may include the signature and/or payload from request 212. Consequently, when received by verifier 204, verifier 204 may perform verification process 220, which may be similar to verification process 216 but performed using verification information available to verifier 204 such as that included in verification repository 219 and/or any verification information forwarded by recipient 202 (which may include verification information available to it).

Verifier 204 may be selected by verification process 216 based on, for example, (i) lookup tables that associate different types of requests with different verifiers, (ii) lookup tables that associate different initiators with different verifiers, (iii) lookup tables that associate different activities with different verifiers, and/or other sources of information.

Any of the lookup tables may associate different types of requests/initiators/activities with prioritized lists of different initiators. If a highest priority verifier is unable to verify request 212, then recipient 202 may sequentially attempt to verify requests 212 by sending request 218 to progressively lower priority verifiers in a priority list.

While described with respect to different lookup tables, it will be appreciated that the different combinations of types of requests/initiators/activities (and/or other types of information regarding initiators, recipients, and requests for activities) may be associated with different priory lists.

When received by verifier 204, request 218 may be processed by verification process 220 to obtain response 222. Response 222 may (i) indicate whether the authority is delegated to recipient 202, and (ii) be cryptographically verifiable (e.g., by including a signature). To indicate whether the authority is delegated, response 222 may include certificates that allow recipient 202 to establish a certificate chain to verify that initiator 200 has been delegated sufficient authority for the activity, attestations that sufficient authority has been delegated to initiator 200 for the activity (in which the cryptographically verifiable signature may be part of the attestation, as opposed to being separate from it), and/or other types of verifiable data structures usable by recipient 202 to verify request 212.

Turning to FIG. 2B, a second data flow diagram in accordance with an embodiment is shown. The second data flow diagram may illustrate data used in and data processing performed in invocation of functionality of data processing systems, and verification of requests for the invocation of the functionality.

Continuing with the discussion from FIG. 2A, once obtained, response 222 may be sent to recipient 202. When received by recipient 202, verification process 216 may continue the process of attempting to verify request 212, but using the information included in response 222, such as certificates, attestations, etc.

If request 212 is successfully verified, activity process 234 may be initiated. During activity process 234, the activity requested in request 212 may be performed.

Turning to FIG. 2C, a third data flow diagram in accordance with an embodiment is shown. The third data flow diagram may illustrate data used in and data processing performed in invocation of functionality of data processing systems, and verification of requests for the invocation of the functionality.

Continuing with the discussion from FIG. 2B, in addition to processing response 222 for verification purposes, verification process 216 may also generate any number of verification data updates (e.g., 242). The verification updates may include any newly obtained verification information from response 222. The verification updates may be used to update verification repository 214 (e.g., by adding additional verification data to it). Consequently, recipient 202 may be more likely to be able to verify requests in the future.

Thus, using the flows illustrated in FIGS. 2A-2C, a system in accordance may enable initiators that may be resource constrained to invoke the functionality of recipients even if the requests for invoking the functions and the local available information verification information are insufficient to verify the requests.

As discussed above, the components of FIG. 1 may perform various methods to manage the operation of and/or interactions between endpoint devices. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing secure operation of endpoint devices in accordance with an embodiment is shown. The method may be performed by any of endpoint devices 100, management system 110, and/or other components of the system shown in FIG. 1.

Prior to operation 300, an entity hosted by a data processing system (e.g., an initiator) may identify that a functionality of another data processing system (e.g., a requestor) needs to be invoked to accomplish a goal.

At operation 300, a request for performance of an activity is obtained from an initiator. The request may be obtained by receiving it in a message, by reading it from storage, and/or via other methods. The message may be received, for example, via a limited communication channel. The limited communication channel may limit the amount of data that may be sent. Consequently, the message may not include verification data usable to verify the request.

At operation 302, a determination is made regarding whether the request is verifiable using local verification data. The determination may be made by attempting to establish a chain of delegations of authority for a requested activity to the initiator. If the chain cannot be established, then it may be determined that the requests is not verifiable using local verification data.

If the request is not verifiable, then the method may proceed to operation 304. Otherwise the method may proceed to operation 312.

At operation 304, a remote verifier for the request is identified. The remote verifier may be identified based on the initiator, the recipient of the request, and/or various information included in the request. For example, the aforementioned information may be used to perform a lookup which may return an identity of the remote verifier.

At operation 306, a request for the remote verifier to verify the request may be made. The request may be made be generating a request and sending the request to the remote verifier. The request may challenge the remote verifier to verify that the initiator has authority to cause the recipient to perform the requested activity.

At operation 308, a determination may be made regarding whether the remote verifier is able to verify the request. The determination may be made based on a response to the request. The response may be made by the remote verifier, and may include information indicating whether the request is verifiable. If verifiable, the response may include attestations, certificates, and/or other cryptographic information usable to cryptographically verify that the initiator has authority to initiate the activity by the requestor.

If the remote verifier can verify the request from the initiator, then the method may proceed to operations 310 and 312. Otherwise the method may proceed to operation 314.

At operation 310, the local verification data is updated. The local verification data may be updated by adding the certificates, attestations, etc. from the response from the remote verifier to existing local verification data.

At operation 312, the requested activity is performed. The requested activity may be performed by initiating performance of one or more actions by the recipient.

The method may end following operations 310 and/or 312.

Returning to operation 308, the method may proceed to operation 314 when the remote verifier is unable to verify the request from the recipient.

At operation 314, the request (e.g., from the initiator) for performance of the activity by the recipient is rejected by the recipient. The request may be rejected by discarding the request, notifying the initiator that the request is rejected, and/or performing other actions to manage rejected requests.

The method may end following operation 314.

Thus, using the method illustrated in FIG. 3, an initiator may be able to invoke functionality of a recipient even if the recipient is initially unable to verify authority of the initiator. Consequently, the initiator may be used in more challenging connectivity environments.

Figure 4:
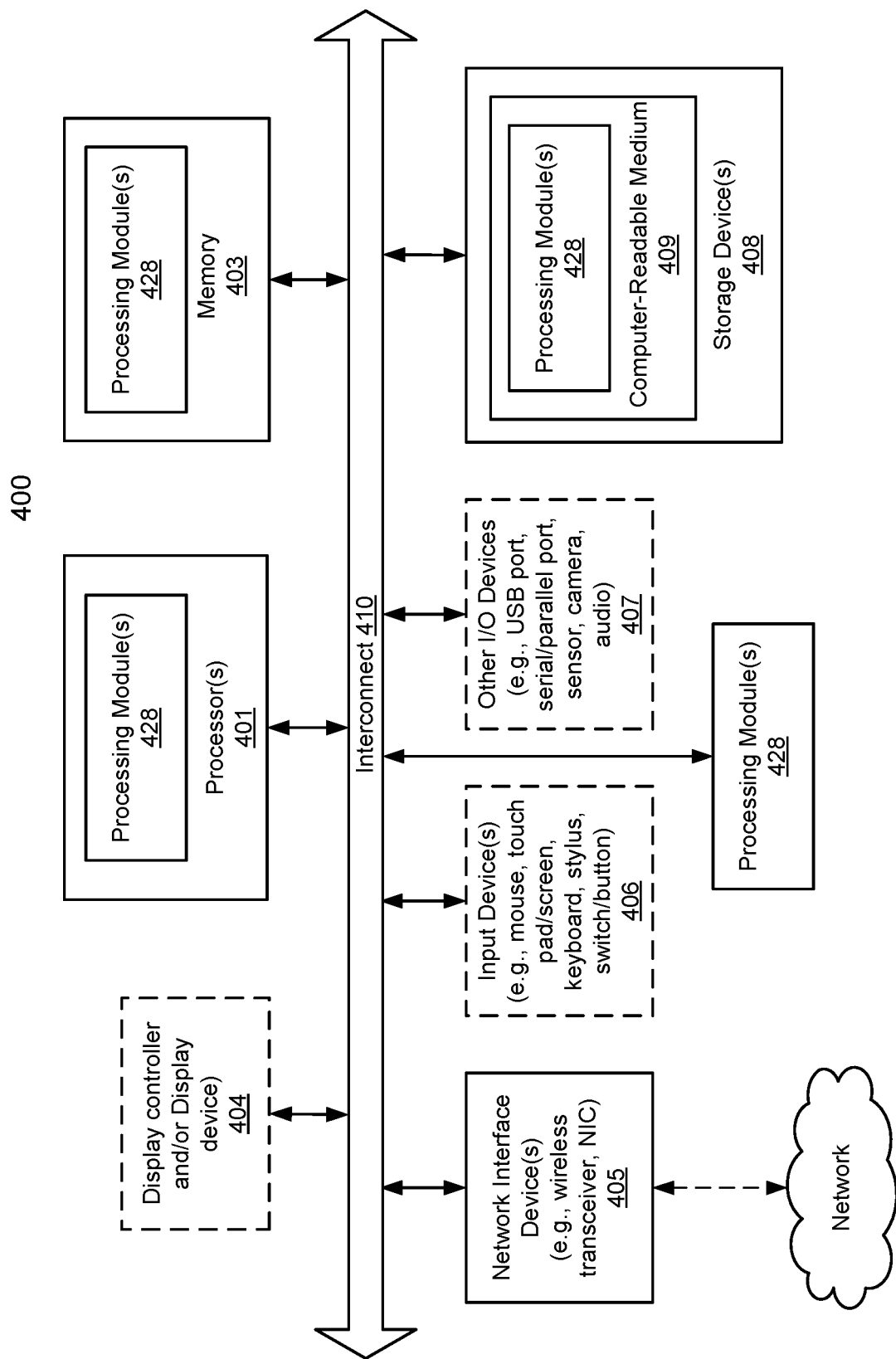
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of devices in a distributed system, the method comprising:
   obtaining, by a recipient and from an initiator, a request for performance of an activity;
   making a first determination regarding whether the request is verifiable using local verification data maintained by the recipient by at least:
      identifying a signature from the request; and
      identifying that the local verification data lacks a certificate chain delegating authority for the activity to an entity that established the certificate, the certificate chain also being usable to authenticate the signature with respect to a root of trust for the recipient;
   in a first instance of the first determination where the request is not verifiable:
      identifying a remote verifier for the request;
      requesting that the remote verifier attempt to verify the request by at least:
         generating a challenge for the remote verifier, the challenge requiring cryptographic data usable to establish trust in the entity; and
         sending the challenge to the remote verifier;
      making a second determination regarding whether the remote verifier successfully verified the request; and
      in a first instance of the second determination where the remote verifier successfully verified the request;
         performing, by the initiator, the activity.

2. The method of claim 1, further comprising:
   in a second instance of the first determination where the request is verifiable:
      performing, by the initiator, the activity.

3. The method of claim 2, further comprising:
   in a second instance of the second determination where the remote cannot verify the request:
      rejecting the request for performance of the activity.

4. The method of claim 1, wherein making the second determination comprises:
   obtaining a challenge response to the challenge; and
   in an instance of the obtaining when the challenge response comprises a signature of a trusted entity and an endorsement of authority of the entity to initiate the activity:
      concluding that the remote verifier verified the request.

5. The method of claim 1, wherein requesting that the remote verifier attempt to verify the request further comprises:
   identifying that the remote verifier is unreachable,
   wherein the challenge is sent to the remote verifier after the remote verifier becomes reachable.

6. The method of claim 1, wherein the request does not comprise verification data for the request, the verification data being usable to verify that the initiator has authority to initiate the activity by the recipient.

7. The method of claim 6, further comprising:
   obtaining, by the recipient and from a second initiator, a second request for performance of an activity, the second request comprising second verification data for the second request, the second verification data being usable to verify that the second initiator has authority to initiate the activity by the recipient.

8. The method of claim 7, wherein the initiator is operably connected to the recipient via a limited channel, the limited channel preventing the verification data from being part of the request.

9. A non-transitory machine-readable medium having instructions stored therein, which when executed by at least one processor, cause a system to perform system first operations for managing operation of devices in a distributed system, the system first operations comprising:
   obtaining, by a recipient and from an initiator, a request for performance of an activity;
   making a first determination regarding whether the request is verifiable using local verification data maintained by the recipient by at least:
      identifying a signature from the request; and
      identifying that the local verification data lacks a certificate chain delegating authority for the activity to an entity that established the certificate, the certificate chain also being usable to authenticate the signature with respect to a root of trust for the recipient;

in a first instance of the first determination where the request is not verifiable:

identifying a remote verifier for the request;

requesting that the remote verifier attempt to verify the request by at least:

generating a challenge for the remote verifier, the challenge requiring cryptographic data usable to establish trust in the entity; and sending the challenge to the remote verifier;

making a second determination regarding whether the remote verifier successfully verified the request; and in a first instance of the second determination where the remote verifier successfully verified the request;

performing, by the initiator, the activity.

10. The non-transitory machine-readable medium of claim 9, wherein the operations further comprise:

in a second instance of the first determination where the request is verifiable:

performing, by the initiator, the activity.

11. The non-transitory machine-readable medium of claim 10, wherein the operations further comprise:

in a second instance of the second determination where the remote cannot verify the request:

rejecting the request for performance of the activity.

12. The non-transitory machine-readable medium of claim 9, wherein making the second determination comprises:

obtaining a challenge response to the challenge; and in an instance of the obtaining when the challenge response comprises a signature of a trusted entity and an endorsement of authority of the entity to initiate the activity:

concluding that the remote verifier verified the request.

13. The non-transitory machine-readable medium of claim 9, wherein requesting that the remote verifier attempt to verify the request further comprises:

identifying that the remote verifier is unreachable, wherein the challenge is sent to the remote verifier after the remote verifier becomes reachable.

14. The non-transitory machine-readable medium of claim 9, wherein the request does not comprise verification data for the request, the verification data being usable to verify that the initiator has authority to initiate the activity by the recipient.

15. A data processing system, comprising:

a processor; and a memory coupled to the processor to store instructions, which when executed by the processor, cause the data processing system to perform operations for managing operation of devices in a distributed system, the operations comprising:

obtaining, by the data processing system and from an initiator, a request for performance of an activity, the data processing system being associated with a recipient of the request;

making a first determination regarding whether the request is verifiable using local verification data maintained by the data processing system by at least:

identifying a signature from the request; and identifying that the local verification data lacks a certificate chain delegating authority for the activity to an entity that established the certificate, the certificate chain also being usable to authenticate the signature with respect to a root of trust for the recipient;

in a first instance of the first determination where the request is not verifiable:

identifying a remote verifier for the request;

requesting that the remote verifier attempt to verify the request by at least:

generating a challenge for the remote verifier, the challenge requiring cryptographic data usable to establish trust in the entity; and sending the challenge to the remote verifier;

making a second determination regarding whether the remote verifier successfully verified the request; and in a first instance of the second determination where the remote verifier successfully verified the request;

performing, by the initiator, the activity.

16. The data processing system of claim 15, wherein the operations further comprise:

in a second instance of the first determination where the request is verifiable:

performing, by the initiator, the activity.

17. The data processing system of claim 16, wherein the operations further comprise:

in a second instance of the second determination where the remote cannot verify the request:

rejecting the request for performance of the activity.

18. The data processing system of claim 15, wherein making the second determination comprises:

obtaining a challenge response to the challenge; and in an instance of the obtaining when the challenge response comprises a signature of a trusted entity and an endorsement of authority of the entity to initiate the activity:

concluding that the remote verifier verified the request.

19. The data processing system of claim 15, wherein requesting that the remote verifier attempt to verify the request further comprises:

identifying that the remote verifier is unreachable, wherein the challenge is sent to the remote verifier after the remote verifier becomes reachable.

20. The data processing system of claim 15, wherein the request does not comprise verification data for the request, the verification data being usable to verify that the initiator has authority to initiate the activity by the recipient.

* * * * *